Nov. 2, 1926.

J. F. HERBERT, JR 1,605,725

OCULO MICROSCOPIC AND PHOTOGRAPHIC APPARATUS

Filed July 20, 1923 4 Sheets-Sheet 1

J. Frederick Herbert, Jr.
INVENTOR

BY Victor J. Evans

ATTORNEY

WITNESS:

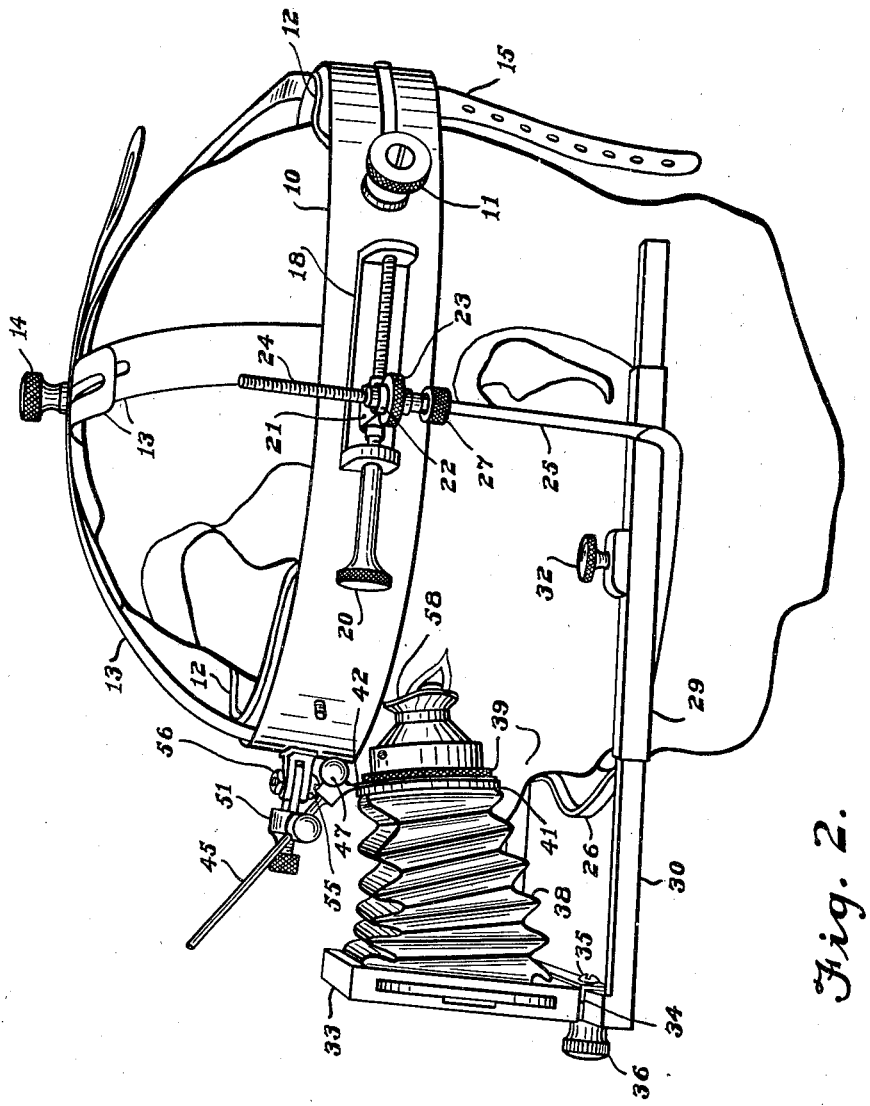

Nov. 2, 1926.  
J. F. HERBERT, JR  
1,605,725  
OCULO MICROSCOPIC AND PHOTOGRAPHIC APPARATUS  
Filed July 20, 1923  
4 Sheets-Sheet 3

J. Frederick Herbert, Jr.
INVENTOR

ATTORNEY

Nov. 2, 1926.
J. F. HERBERT, JR
1,605,725
OCULO MICROSCOPIC AND PHOTOGRAPHIC APPARATUS
Filed July 20, 1923    4 Sheets—Sheet 4
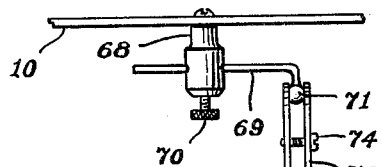
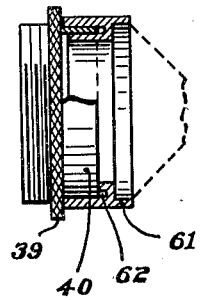
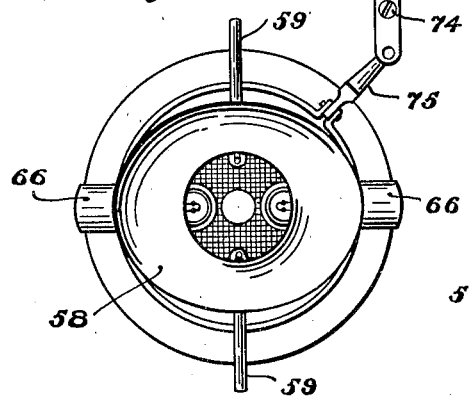
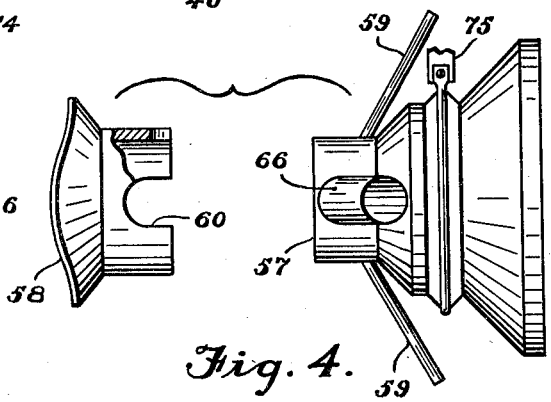
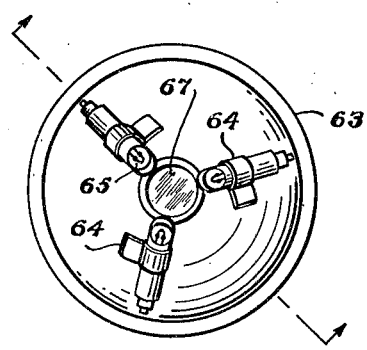
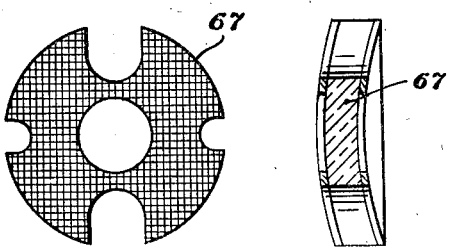
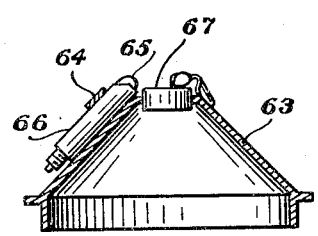
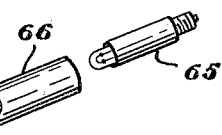
J. Frederick Herbert, Jr.
INVENTOR
Victor J. Evans
ATTORNEY
WITNESS Patented Nov. 2, 1926.

1,605,725

UNITED STATES PATENT OFFICE.

J. FREDERICK HERBERT, JR., OF PHILADELPHIA, PENNSYLVANIA.

OCULO-MICROSCOPIC AND PHOTOGRAPHIC APPARATUS.

Application filed July 20, 1923. Serial No. 652,844.

This invention relates to an oculo-microscopic and photographic apparatus, for internal and external examination and photography of the eye and other objects.

The principal object is to produce a device of this nature which shall be simple, practical and efficient, overcoming the disturbing corneal reflexes heretofore encountered in devices of this nature, and securing ample and uniformly distributed illumination and a large optical field.

Another object is to produce a device of this nature which may be conveniently held in apposition to the eye and adjustably supported and held in adjusted position regardless of movements of the patient.

Another object is to hold the illuminating means and lens in direct contact or close contiguity with the eye of the patient.

Another object is to provide the conformer with suitable means for flooding the eye after the apparatus has been partly or wholly adjusted, so as to maintain any desired liquid between the lens and the eye.

Another object is to so associate the lens and illuminating means, that the latter may not effect reflections or high-lights by playing on the former.

Another object is to so associate the eye and the illuminating means that the latter may not effect disturbing reflexes or highlights on the cornea, by screening the side radiations of the illuminant to within close proximity or contact with the cornea, thus intercepting corneal or back reflexes at their source.

Another object is to provide the device with an eye conformer which will hold the eyelids apart, is supported by the lid, and steadies the eye.

Other objects will be apparent from the following description and claims, the invention consisting essentially of certain novel construction and combination of parts, the elements of which are hereinafter fully described, are particularly pointed out in the appended claims, and are illustrated in the accompanying drawing, in which:—

Figure 1:
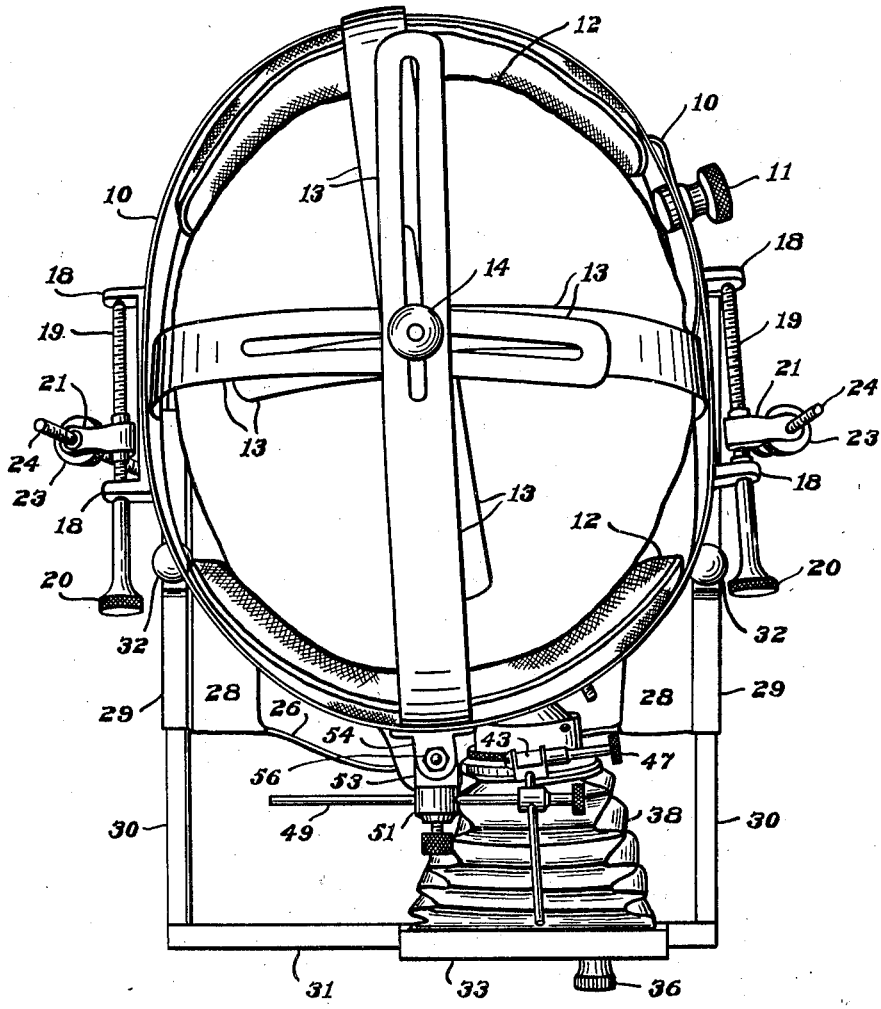

Figure 1 is a top plan view of the complete device.

Figure 3:
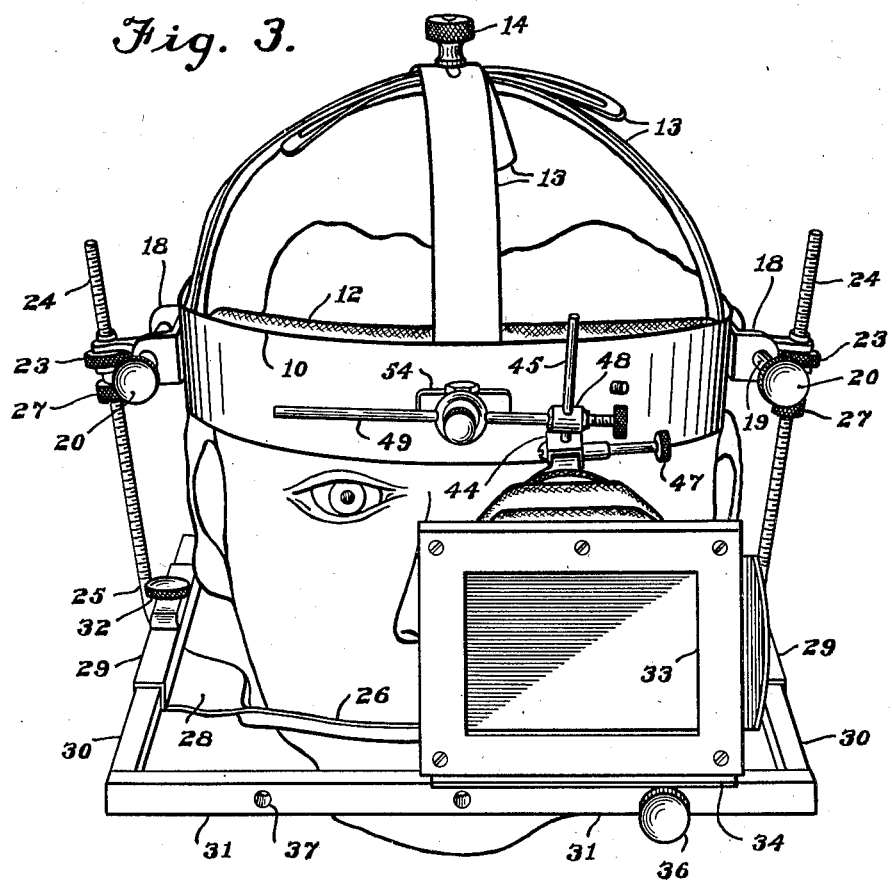

Figure 2 is a side elevation of the same.
Figure 3 is a front elevation of the same.
Figure 4 is a detail detached elevation of the preferred form of conformer.

Figure 13:
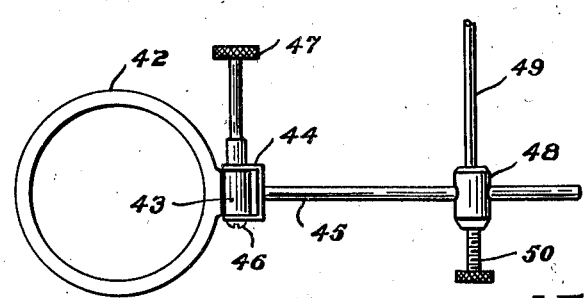
Figure 6:
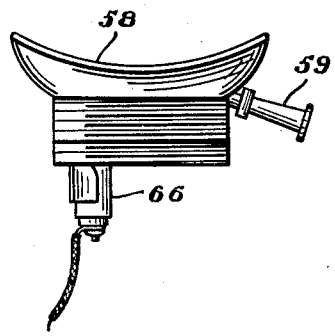
Figure 7:
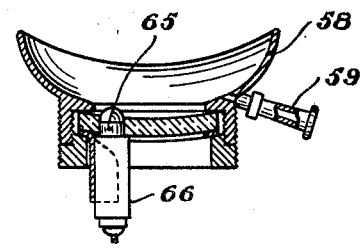

Figure 5 is a front elevation of the same.
Figure 6 is a side elevation of another form of conformer.
Figure 7 is a sectional view of the same.
Figure 8 is a top plan view of a third form of the conformer.
Figure 9 is a sectional view of the same.
Figure 10 is an enlarged elevation of the lens per se.
Figure 11 is a sectional view of the same.
Figure 12 is an enlarged detail of the light tube.
Figure 13 is a detail view of one of the members.
Figure 14 is a side elevational view partly in section of the threaded annular camera attaching member indicating the manner of detachably securing thereto, a conformer indicated by the broken lines.

Like characters of reference refer to like parts in all views.

The head gear.

The entire device is preferably supported by the patient's head, as by this method several advantages are obtained. In the first place, the entire device moves with the head of the patient so that the adjustments are not disturbed by such movements; secondly, there is no danger of striking or injuring the eye by the tossing about of a restless patient; it is extremely convenient to the operator and comfortable to the patient; and it gives a convenient and suitable means of supporting and adjusting appliances.

Referring to the drawing in detail, 10 represents the main head-band which encircles the head of the patient above the eyes, and may be adjusted to any size of head by a bolt-and-slot connection at 11. Suitable pads 12 are secured to the band 10 in any desired manner. A plurality (preferably four) fixing bands 13 extend from band 10 up to the top of the head where they are adjustably secured together by a thumb bolt 14. In the rear, a depending spring steel strip 15 follows the general contour of the head.

Adjustable camera support.

Mounted on each side of band 10 are brackets 18 which rotatably support adjusting screws 19 having finger pieces 20. Sleeves 21 are threadedly mounted on the screws 19 in such manner that manipulation of the screws 19 will effect movement of the sleeves forwardly or rearwardly along the band 10.

Each sleeve 21 carries an arm 22 which is bifurcated to receive a thumb nut 23. Passing through each nut 23 and arm 22 is one vertically disposed end 24 of a bar or rod 25, the central portion of which is indicated at 26, and lies in a horizontal plane. The ends 24 are threaded into the nuts 23, and manipulation of these nuts will effect vertical adjustment of the bar 25. Lock-nuts 27 may be employed to secure the device in vertical adjusted position. Secured at opposite sides of the portion 26 above referred to are reinforcing plates 28 which terminate laterally in tubular elements 29 of square or angular cross section. The entire bar 25 together with plates 28 and tubular elements 29 form what I term a stage.

Mounted for sliding movement in tubular elements 29 are rods or bars 30 of square or other cross-section to accord with the cross-sectional contour of members 29. The rods 30 are rigidly secured together at their forward end by a cross-bar 31 so as to form a comparatively substantial frame adjustable forwardly and rearwardly. The frame may be held against sliding movement on the stage by thumb screws or set screws 32.

The camera.

Upon the cross-bar 31, is mounted the camera obscura 33 which is provided with a depending slotted plate 34 riding along the inside of the bar 31 and held by a headed bolt 35 and nut 36 which may co-operate with any one of a plurality of holes 37 in said bar 31. For the purpose of tilting, a ball and socket joint may be interposed between camera 33 and plate 34, if desired. The bellows of the camera is indicated at 38 and is of the usual construction. Removably mounted at the front of the camera is a nut 39 formed with a forwardly extending annular portion 40 upon which the conformer, which will be presently described, is seated.

The nut 39 preferably threadedly engages with the frame 41 at the front of the bellows and between the two there is secured a flat ring or washer 42 secured to a knuckle 43 mounted between the bifurcations 44 at the lower end of a rod 45. The knuckle 43 is hung on a pintle 46 passing through the bifurcations and threaded on one end to receive a manipulative member 47 for maintaining the knuckle in adjusted position. The rod 45 is adjustable longitudinally in a boss 48 mounted on one end of a horizontally disposed rod 49, and may be maintained in any suitable position to which it may be moved, by means of a thumb-screw 50. Rod 49 is adjustably mounted in a member 51 provided with a rearwardly extending tongue 53 which fits between the lips of a clevis 54 and is pivoted on a bolt 55 provided with a nut 56 by which member 51 may be secured in any adjusted position.

The clevis 54 is preferably mounted at the center front of the band 10, and by removing the rod 49 and reversing its position in member 51, the camera may be readily adjusted to either eye.

The conformer.

What I term the conformer is a shell, the purpose of which is to screen the sclera exposing only the transparent pupillary area of the cornea for observation, to hold the eyelids apart, to support the lenses, to support the illuminating means, to accommodate any desired plates, filters, screens, etc., and to provide a liquid chamber whereby the eye may be flooded at the point of contact with the lens. In the drawing, several forms of conformers are illustrated, that shown in Figure 4 being the preferred form. In this form it will be seen that the conformer comprises a tubular, lens-and-screen supporting portion 57 having one end flared out into a curvilinear flange 58 which is adapted to fit against the eyeball beneath the eyelids so as to mask the sclera and hold the lids open and against obstructing the lens. The lens and illuminating device will be presently described in detail. The lens tube is apertured to provide outlet and inlet ducts 59 by which means the air may be removed and water or other immersion medium may be introduced after the device is adjusted to the patient. Passing into the tube the ducts are inserted in the preferred form in the edge of the lens 67, the lens being cut away for this purpose. One or more apertures 60 are provided for the insertion of the illuminating means as will be presently set forth. At the other end of the conformer there is a collar 61 having an annular recess 62 to receive the sleeve or annular portion 40 of the nut 39 hereinbefore described. The elements are a sliding fit so as to provide a convenient, quickly adjustable, and absolutely light-proof joint.

In the form of device shown in Figure 8, the conformer will be seen to be devoid of the duct 59 and apertures 60, the illuminating means being supported wholly within the conformer.

The form shown in Figure 9 is particularly adapted for use in certain appliances as an illuminator for opaque objects for the lower powers of the microscope, or the anterior ocular segments, where, owing to the greater distance of the objective lens from the object, the close alignment of the optical axis, and source of illumination is less imperative. In this case, the illuminator takes the form of a truncated cone 63 with the lens supported in the smaller end thereof, and with a plurality of supports 64 on its exterior surface for holding the illuminating means.

The illuminating means.

As shown in the several views, the illuminating means consists of one or more electric light bulbs 65 which are slidably supported in light tubes 66, the surfaces of which may be darkened in any suitable manner, and which are provided with side or end apertures as may be necessary, according to the type of conformer used.

A lens, prism, reflector, optical crystal, color screen or filter, etc., may be interposed in the "light tube" between the illuminating source and the eye of the patient or object of observation.

The light tube is inserted in the preferred form, in the edge of the lens 67, the lens being cut away for this purpose. While only one lens and two lights are shown, it is to be understood that there may be a number of lenses, and that a number of lights may be used if found desirable. The principal point of this construction is to bring the eye-contacting lens surface and the illuminating means in the same or nearly the same plane, to permit close proximity to the cornea, and to effectually screen or shield the light from radiating in any direction except toward the cornea. This obviates the necessity of passing any direct or reflected light through the optical system, thus avoiding annoying reflections and at the same time, maintaining close alignment with the optical system. The light tube intercepts the back reflections from the cornea.

In the form shown in Figure 6, the illuminating means is supported wholly within the conformer, and extends obliquely through the lens; while in that form shown in Figure 9, the illuminating means is supported wholly without the conformer. However, in the preferred form, the illuminating means is thrust through the conformer and into the edge of the lens. The conformer assembled with its lenses and lighting tubes, etc., forms a reflectionless ophthalmo-illuminator.

The advantages of this construction are, minimum loss of lens power, maximum transmission of light through lens, wide angle of refraction, no disturbing reflexes, intense evenly diffused illumination, optical and illuminating systems in closest alignment, lens and illuminant may be brought simultaneously in closet contact with the object, photographic advantages, simplicity, lightness, convenience, quick and easy adjustment, and comfort and safety of patient.

The interior parts of the apparatus are blackened in the usual manner to overcome reflections. In a like manner and purpose, the edges and optically unnecessary portions of the lens surface may be blackened as indicated in Figures 10 and 11.

In conjunction with the primary objective lens or contact illuminator lens, any number of accessory lenses may be employed according to the requirements of the instrument and use. Likewise, color screens, filters, diaphragms, shutters, etc., may be utilized.

These types of illuminators may be used in conjunction with instruments of observation other than here described, such as ophthalmoscopes, corneal microscopes, magnifying loupes, microscope objectives, etc.

The camera may be replaced by other attachments as focusing lenses, microscopic or telescopic tubes, etc.

The method of focusing apparatus.

For inanimate objects, and dumb animals or blind persons, the focusing of the sensitive plate is done in the usual manner with a ground glass plate. However, when the interior of the eye of an intelligent person is to be photographed, the operation of focusing may be greatly simplified and facilitated, and much inconvenience to the subject due to prolonged glare of the illumination avoided, by substituting a fine lined test object in the central portion of the ground glass plate. The apparatus being in position and the subject looking through it, the test object is brought into distinct focus of the eye of the subject, whose accommodation should be arrested by a cycloplegic. The retina then being the conjugate focus of the adjusted test object, the sensitive plate may be placed in position, ready for exposure.

As shown in Figure 5, the conformer may be supported by a universally adjustable arrangement of a different type. In this form, a shank 68 is secured to the head-band 10 by a screw or other suitable means and adjustably supports a rod 69 held in position by a thumb screw 70. The end of rod 69 is formed with a ball 71 which is gripped between the ends of links 72. Secceeding pairs of links have ball-ended members 73 inserted therebetween, each pair of links being provided with a screw 74 whereby the pressure upon the balls may be increased so as to frictionally hold the conformer in any position to which it may be moved. The final pair of links 72 are secured to the conformer by any desired securing means as for instance, a band and link 75.

While I have described what I deem to be the most desirable embodiment of my invention, it is obvious that many of the parts may be varied without in any way departing from the spirit of my invention, and I therefore do not limit myself to the exact details of construction herein shown nor to anything less than the whole of my invention limited only by the appended claims.

What I claim is:—

1. In an oculo-photographic apparatus, a substantially conical casing, a lens supported by said casing, a plurality of lamp receiving tubes attached to said casing, in juxtaposition to said lens, a like number of lamp bulbs positioned in said tubes, and said bulbs shielded by said tubes for screening said lens from the light rays of said lamp bulbs.

2. In an oculo-photographic apparatus, a supporting casing, a lens formed with a plurality of arcuate cut-out portions in the periphery thereof positioned in said casing, a plurality of lamp supporting tubes secured on said casing, and a like number of lamps positioned in said tubes.

3. In an oculo-photographic apparatus, a conical supporting casing having a curvilinear conformer detachably positioned in said end, a plurality of tubes equally spaced about said conical casing, a like number of lamp bulbs positioned in said tubes and extending adjacent the circumferential edge of said lens, said tubes adapted for projecting the light rays forwardly of said lens.

4. In an oculo-photographic apparatus, a substantially conical casing, a curvilinear conformer detachably positioned at the front end of said casing, a lens having a central transparent portion, the remainder of said lens suitably shaded, a pair of relatively large and small oppositely spaced arcuate recesses in the periphery thereof at right angles to each other, a pair of angularly projecting lamp tubes secured on the outer periphery of said front end, a pair of lamp bulbs positioned in said tubes, said tubes and bulbs extending into said large arcuate recesses, a pair of angularly extending flooding tubes secured to the outer periphery of said front end at right angles to said lamp tubes, said flooding tubes registering with and extending into the small arcuate recesses in said lens.

5. In an oculo-photographic apparatus, a conical casing, a curvilinear conformer detachably positioned on the front end of said casing, a lens positioned in said front end having a pair of spaced arcuate recesses in the periphery thereof, a pair of angularly and rearwardly projecting oppositely disposed tubes secured to the said front end, a pair of lamp bulbs positioned in said tubes and extending into the said arcuate recesses in said lens, said oppositely disposed tubes having one end thereof closed and the side of said tubes apertured adjacent the closed ends for projecting the light rays forwardly of said lens, and a pair of angularly and oppositely extending flooding tubes secured to said front end at right angles to said lamp tubes.

6. In an oculo-photographic apparatus, a frustro-conical casing, a lens positioned in the front end of said casing, a plurality of lamp receiving tubes equally spaced and secured about the conical surface of said casing with their converging ends closed and in close proximity to said lens, said closed converging ends of said tubes provided with an aperture adjacent said closed ends, a like number of lamp bulbs positioned in said tubes, said bulbs shielded by the closed ends of said tubes for screening said lens from the light rays, said aperture adjacent said closed ends projecting the said light rays forwardly of said lens, and a flanged curvilinear conformer adapted to be positioned over said lens, lamps and tubes for supporting the said apparatus in contact with the eye.

In testimony whereof I affix my signature.

J. FREDERICK HERBERT, Jr.